United States Patent
Dahlmann et al.

(10) Patent No.: US 7,297,823 B2
(45) Date of Patent: Nov. 20, 2007

(54) ADDITIVES FOR INHIBITING THE FORMATION OF GAS HYDRATES

(75) Inventors: Uwe Dahlmann, Heidelberg (DE); Michael Feustel, Köngernheim (DE); Christoph Kayser, Mainz (DE); Roman Morschhaeuser, Mainz (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 708 days.

(21) Appl. No.: 10/432,648

(22) PCT Filed: Nov. 6, 2001

(86) PCT No.: PCT/EP01/12811

§ 371 (c)(1), (2), (4) Date: May 23, 2003

(87) PCT Pub. No.: WO02/44519

PCT Pub. Date: Jun. 6, 2002

(65) Prior Publication Data

US 2004/0030206 A1    Feb. 12, 2004

(30) Foreign Application Priority Data

Dec. 1, 2000    (DE) ................. 100 59 816

(51) Int. Cl.
*C07C 7/20*    (2006.01)
*E21B 37/06*    (2006.01)

(52) U.S. Cl. .......... 585/15; 585/950; 95/153; 137/13

(58) Field of Classification Search ......... 585/15; 507/90
See application file for complete search history.

(56) References Cited

U.S. PATENT DOCUMENTS

| | | | |
|---|---|---|---|
| 5,848,644 A | 12/1998 | Velly et al. | 166/267 |
| 6,093,862 A * | 7/2000 | Sinquin et al. | 585/15 |
| 6,107,531 A * | 8/2000 | Colle et al. | 585/15 |
| 6,451,892 B1* | 9/2002 | Bakeev et al. | 524/386 |
| 6,544,932 B2* | 4/2003 | Klug et al. | 507/90 |
| 6,566,309 B1* | 5/2003 | Klug et al. | 507/90 |
| 6,878,788 B2* | 4/2005 | Angel et al. | 526/264 |
| 6,894,007 B2* | 5/2005 | Klug et al. | 507/90 |
| 6,905,605 B2* | 6/2005 | Klomp | 210/698 |
| 7,008,466 B2* | 3/2006 | Collins | 95/153 |

FOREIGN PATENT DOCUMENTS

| | | |
|---|---|---|
| EP | 0 896 123 | 2/1999 |
| WO | 93/25798 | 12/1993 |
| WO | 94/12761 | 6/1994 |
| WO | 96/41784 | 12/1996 |
| WO | 96/41786 | 12/1996 |
| WO | 98/23843 | 6/1998 |

OTHER PUBLICATIONS

PCT Search Report for application No. PCT/EP 01/12811 filed on Nov. 6, 2001.

* cited by examiner

*Primary Examiner*—Ellen M. McAvoy
(74) *Attorney, Agent, or Firm*—Richard P. Silverman

(57) ABSTRACT

The invention relates to the use of polymers which contain between 1 and 99 mol-% structural units of formula 1,

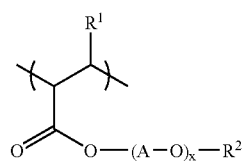

(1)

wherein $R^1$ represents hydrogen or $C_1$-$C_6$ alkyl, $R^2$ represents $C_1$-$C_{24}$-alkyl, $C_2$-$C_{24}$-alkylene or a $C_6$-$C_{18}$-aryl radical, which can be substituted with a $C_1$-$C_{12}$-alkyl group, A represents identical or different $C_2$-$C_4$ alkylene radicals and, x, represents whole number from 2-40 in quantities from 0.01-2 wt-%, in quantities from 0.01 to 2 wt-%, in relation to the aqueous phase. The polymers can be used as gas hydrate inhibitors.

9 Claims, No Drawings

ADDITIVES FOR INHIBITING THE FORMATION OF GAS HYDRATES

The present invention relates to an additive and a process for inhibiting nucleation, growth and/or agglomeration of gas hydrates by adding an effective amount of an inhibitor which contains comb polymers of alkylpolyoxyalkylene acrylates to a multiphase mixture tending to form gas hydrates and comprising water, gas and optionally condensate or to a drilling fluid tending to form gas hydrates.

Gas hydrates are crystalline inclusion compounds of gas molecules in water, which form under certain temperature and pressure conditions (low temperature and high pressure). Under said conditions, the water molecules form cage structures around the corresponding gas molecules. The framework formed from the water molecules is thermodynamically unstable and is stabilized only by the incorporation of guest molecules. Depending on pressure and gas composition, these ice-like compounds can also exist at above the freezing point of water (up to more than 25° C.).

In particular, the gas hydrates are of considerable importance in the mineral oil and natural gas industry, said gas hydrates forming from water and the natural gas components methane, ethane, propane, isobutane, n-butane, nitrogen, carbon dioxide and hydrogen sulfide. Particularly in present day natural gas production, the existence of these gas hydrates constitutes a major problem, particularly when wet gas or multiphase mixtures comprising water, gas and alkane mixtures are exposed to low temperatures under high pressure. Here, owing to its insolubility and crystalline structure, the formation of the gas hydrate leads to the blocking of various transport means, such as pipelines, valves or production means in which wet gas or multiphase mixtures are transported over relatively long distances at low temperatures, as occurs especially in colder regions of the earth or at the bottom of the sea. In addition, the formation of gas hydrates can also lead to problems in the drilling process for the development of new gas and mineral oil deposits under corresponding pressure and temperature conditions by forming gas hydrates in the drilling fluids.

In order to avoid such problems, the formation of gas hydrates in gas pipelines, during the transport of multiphase mixtures or in drilling fluids can be suppressed by using relatively large amounts (more than 10% by weight based on the weight of the aqueous phase) of lower alcohols, such as methanol, glycol or diethylene glycol. The addition of these additives shifts the thermodynamic limit of the formation of gas hydrates to lower temperatures and higher pressures (thermodynamic inhibition). However, the addition of these thermodynamic inhibitors gives rise to relatively major safety problems (flashpoint and toxicity of the alcohols), logistical problems (large storage tanks, recycling of these solvents) and accordingly high costs, especially in offshore production.

Attempts are therefore now being made to replace thermodynamic inhibitors by adding, in temperature and pressure ranges in which gas hydrates can form, additives in amounts of up to 2% by weight which either delay the formation of gas hydrates (kinetic inhibitors) or keep the gas hydrate agglomerates small and therefore pumpable so that they can be transported through the pipeline (i.e. agglomerate inhibitors or antiagglomerates). The inhibitors used thereby either prevent the nucleation and/or the growth of the gas hydrate particles or modify the hydrate growth so that smaller hydrate particles result.

In addition to the known thermodynamic inhibitors, a large number of monomeric and polymeric classes of substances which act as kinetic inhibitors or agglomerate inhibitors are described as gas hydrate inhibitors in the patent literature. Of particular importance here are polymers having a carbon backbone which contain both cyclic (pyrrolidone or caprolactam radicals) and acyclic amide structures in the side groups.

Thus, WO-94/12761 describes a process for the kinetic inhibition of the formation of gas hydrates by the use of polyvinyllactams having a polymer weight of $M_W$ of >40 000 D, and WO-93/25798 describes such a process using polymers and/or copolymers of vinylpyrrolidone having a polymer weight $M_W$ of from >5 000 to 40 000 D.

EP-A-0 896 123 discloses gas hydrate inhibitors which may contain copolymers of alkoxylated (meth)acrylic acid without an alkyl endcap and cyclic N-vinyl compounds.

The additives described have only limited efficiency as kinetic gas hydrate inhibitors and/or antiagglomerates or are not available in a sufficient amount or available only at high prices.

In order to be able to use gas hydrate inhibitors also with greater supercooling than is possible at present, i.e. further within the hydrate region, a further increase in activity compared with the hydrate inhibitors of the prior art is required. In addition, products improved with respect to their biodegradability and toxicity are desired.

It was therefore an object of the present invention to provide improved additives which both slow down the formation of gas hydrates (kinetic inhibitors) and keep gas hydrate agglomerates small and pumpable (antiagglomerates), in order thus to ensure a wide range of applications with a high action potential. Furthermore, the thermodynamic inhibitors currently used (methanol and glycols), which give rise to considerable safety problems and logistical problems, are to be replaced by novel additives.

As has now surprisingly been found, both water-soluble and oil-soluble comb polymers which are based on alkoxyalkyl-substituted (meth)acrylic acid are suitable as gas hydrate inhibitors. Depending on the structure, the products can both delay the nucleation and growth of hydrates (kinetic gas hydrate inhibitors) and suppress the agglomeration of gas hydrates (agglomerate inhibitors).

The invention therefore relates to the use of polymers comprising from 1 to 100 mol % of structural units of the formula

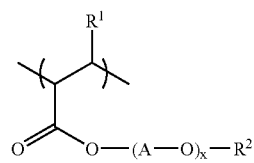

(1)

in which
$R^1$ is hydrogen or $C_1$-$C_6$-alkyl,
$R^2$ is $C_1$-$C_{24}$-alkyl, $C_2$-$C_{24}$-alkenyl or a $C_6$-$C_{18}$-aryl radical which may be substituted by a $C_1$-$C_{12}$-alkyl group,
A are identical or different $C_2$-$C_4$-alkylene radicals and
x is an integer from 2 to 40, in amounts of from 0.01 to 2% by weight, based on the aqueous phase, as gas hydrate inhibitors.

In addition to the structural units of the formula 1, the polymers according to the invention, unless they consist of 100 mol % of structural units of the formula 1, may contain further structural units. These structural units are those which are derived from olefinically unsaturated monomers which contain O, N, S or P. The polymers preferably contain oxygen-, sulfur- or nitrogen-containing comonomers, in particular oxygen- or nitrogen-containing comonomers.

Suitable monomers which are copolymerizable with structural units of formula 1 are to mention, inter alia, styrenesulfonic acid, acrylamidopropyl-methylenesulfonic acid (AMPS), vinylsulfonic acid, vinylphosphonic acid, allylsulfonic acid, methallylsulfonic acid, acrylic acid, methacrylic acid and maleic acid (and the anhydrides thereof) and the salts of the abovementioned acids with monovalent and divalent opposite ions. Preferably used opposite ions are lithium, sodium, potassium, magnesium, calcium, ammonium, monoalkylammonium, dialkylammonium, trialkylammonium or tetraalkylammonium, in which the alkyl substituents of the ammonium ions, independently of one another, are $C_1$- to $C_{22}$-alkyl radicals which may be occupied by from 0 to 3 hydroxyalkyl groups whose alkyl chain length may vary in a range from $C_2$ to $C_{10}$. In addition, mono- to triethoxylated ammonium compounds having different degrees of ethoxylation can also be used. Sodium and ammonia are particularly preferably used as opposite ions. The degree of neutralization of the mole fraction of the acids described above may also differ from 100%. All degrees of neutralization from 0 to 100% are suitable, the range from 70 to 100% being particularly preferred.

Further suitable monomers are esters of acrylic or of methacrylic acid with aliphatic, aromatic or cycloaliphatic alcohols having a number of carbon atoms from $C_1$ to $C_{22}$. Further suitable monomers are 2- and 4-vinylpyridine, vinyl acetate, glycidyl methacrylate, acrylonitrile, vinyl chloride, vinylidene chloride, tetrafluoroethylene and DADMAC.

The polymers containing structural units of the formula (1) are obtainable by polymerization of alkoxyalkylated (meth)acrylic acid. The latter are obtainable from corresponding polyoxyalkylene glycols by transesterification with appropriately unsaturated carboxylic esters, such as acrylic or methacrylic esters.

Examples of parent products of suitable polyoxyalkylene glycols are compounds having molecular weights of 100 to 1000 g/mol, ethylene oxide/propylene oxide copolymers (block or random copolymers), methylpolyglycols, butylpolyglycols, isobutylpolyglycols and also glycol ethers based on octanol, 2-ethylhexanol, decanol, isodecanol, dodecanol, tetradecanol, hexadecanol, octadecanol, oleyl alcohol and synthetic or natural fatty alcohol cuts. Glycol ethers based on alkylphenols having $C_1$-$C_{12}$-alkyl substituents are likewise suitable.

In a preferred embodiment of the invention, $R^1$ is hydrogen or methyl.

A is a $C_2$-$C_4$-alkylene group or different $C_2$-$C_4$-alkylene groups. This means that the structural units of the formula 1 may be alkoxylated with up to 40 $C_2$-$C_4$-alkoxy units, it being possible for this to be either pure ethoxylation, propoxylation or butoxylation, or a mixed alkoxylation. A is preferably an ethylene or propylene group, in particular an ethylene group. In the case of mixed alkoxylation, a ratio of ethoxy to propoxy groups of from 5:35 to 35:5 is preferred.

The polymers to be used according to the invention preferably contain from 5 to 95, in particular from 20 to 80, mol % of structural units of the formula (1).

Depending on the structure of the structural units of formula (1), the properties of the polymer can be modified in such a way that, according to the existing conditions, they can be used in a targeted manner as specific additives for inhibiting the formation of gas hydrates.

In the case of a short alkyl radical $R^2$ (about $C_1$-$C_8$) or in the case of a high ethylene oxide content, water-soluble products are obtained which can suppress the nucleation of the hydrates and can act as kinetic inhibitors or can enhance the action of other kinetic inhibitors as synergistic components, as shown in the attached examples. Water-soluble is understood here as meaning those substances of which at least 5 g are dissolved in 1 l of water to give a clear solution.

In the case of a longer alkyl radical $R^2$ (about $C_8$-$C_{24}$) or in the case of lower contents of ethylene oxide or with the use of propylene oxide or butylene oxide, comb polymers which are more hydrophobic/lipophilic, have limited oil solubility and a surfactant character and wet the surface of gas hydrate particles with oil and hence prevent the agglomeration of the hydrates are obtained. They thus act as agglomerate inhibitors. The agglomerate inhibitors are in general at least partly soluble in the condensate phase of the multiphase mixture. Here, limited oil solubility is understood as meaning substances of which at least 1 g is soluble in 1 l of solvent naphtha to give a clear solution.

In a preferred embodiment of the invention, copolymers which contain

A) from 1 to 99 mol % of structural units of the formula (1) and
B) from 1 to 99 mol % of structural units of the formula (2)

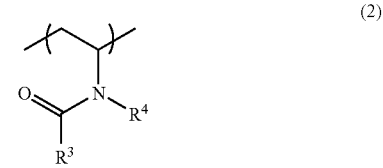

(2)

in which $R^3$ and $R^4$, independently of one another, are hydrogen or $C_1$-$C_6$-alkyl, or form a ring of 5, 6 or 7 ring atoms with inclusion of the nitrogen atom and of the carbonyl group, are used.

Inter alia, N-vinylformamide (NVF), N-vinylmethylformamide, N-vinylmethyl-acetamide (VIMA), N-vinylacetamide, N-vinylpyrrolidone (NVP) and N-vinylcaprolactam may be mentioned as examples. In a preferred embodiment of the invention, the structural units of the formula 2 are derived from N-vinylacetamide, N-methyl-N-vinylacetamide, vinyl-pyrrolidone and vinylcaprolactam.

In a further preferred embodiment of the invention, copolymers which are derived from A) from 1 to 99 mol % of structural units of the formula (1),
B) from 1 to 99 mol % of structural units of the formula (2) and
C) from 1 to 99 mol % of bivalent structural units of the formula (3)

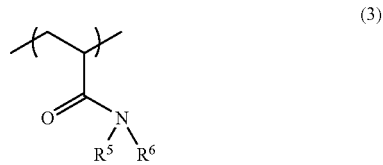

(3)

in which $R^5$ and $R^6$, independently of one another, are hydrogen, $C_1$-$C_6$-alkyl or $C_1$-$C_6$-cycloalkyl, or form a ring having 5, 6 or 7 ring atoms with inclusion of the nitrogen atom, and in which the structural units A), B) and C) sum to 100 mol %, are used.

The preferred amounts of structural units A), B) or C) are from 5 to 95, in particular from 20 to 80, mol % for all embodiments.

$R^3/R^4$ and $R^5/R^6$ together preferably contain in each case at least 1 carbon atom, in particular at least 2 carbon atoms.

The structural units of the formula 3 are preferably derived from acrylic acid, acrylamide, N-alkylacrylamides, N,N-dialkylacrylamides, 2-dimethyl-aminomethacrylate, N-acryloylpyrrolidine, N-acryloylmorpholine and N-acryloylpiperidine.

The preparation of the polymers to be used according to the invention is effected by free radical polymerization of the monomers using a suitable free radical initiator at temperatures of from 50 to 150° C. The molecular weight of these comb polymers may be in the range from 1000 to $10^6$ g/mol, but molecular weights of from 1000 to 40 000 g/mol are preferred.

Water-soluble monoalcohols, such as, for example, propanols, butanols and oxyethylated monoalcohols, such as butylglycol, isobutylglycol and butyldiglycol, are suitable as the alcoholic solvent. In general, clear solutions form after the polymerization.

The polymers can be used alone or in combination with other known gas hydrate inhibitors. In general, the gas hydrate inhibitor according to the invention is added to the system tending to hydrate formation in an amount such that sufficient inhibition is obtained under the existing pressure and temperature conditions. The gas hydrate inhibitors according to the invention are generally used in amounts of from 0.01 to 2% by weight (based on the weight of the aqueous phase), corresponding to 100-20 000 ppm, preferably from 0.02 to 1% by weight. If the gas hydrate inhibitors according to the invention are used as a mixture with other gas hydrate inhibitors, the concentration of the mixture is from 0.01 to 2 or from 0.02 to 1% by weight in the aqueous phase.

EXAMPLES

A stirred steel autoclave having temperature control, pressure transducer and torque pickup and having an internal volume of 450 ml was used for investigating the inhibiting effect of the polymers. For investigations into the kinetic inhibition, the autoclave was filled with distilled water and gas in the volume ratio 20:80, while condensate was also added for investigations of the agglomerate inhibition. Finally, natural gas of 90 bar was forced in.

Starting from an initial temperature of 17.5° C., cooling was effected to 2° C. in the course of 2 h, stirring was then effected for 18 h at 2° C. and heating back to 17.5° C. was effected in the course of 2 h. First, a pressure decrease according to the thermal compression of the gas is observed. If the formation of gas hydrate nuclei occurs during the supercooling time, the measured pressure decreases, an increase in the measured torque and a slight increase in the temperature being observable. Further growth and increasing agglomeration of the hydrate nuclei in the absence of inhibitor rapidly leads to a further increase in the torque. When the mixture is warmed up, the gas hydrates decompose so that the initial state of the experimental series is reached.

The time from reaching the minimum temperature of 2° C. to the initial gas absorption ($T_{ind}$) or the time to the increase in the torque ($T_{agg}$) is used as a measure of the inhibiting effect of the polymer. Long induction times or agglomeration times indicate a kinetic inhibitor effect. On the other hand, the torque measured in the autoclave serves as a quantity for the agglomeration of the hydrate crystals. In the case of a good antiagglomerate, the torque which builds up after formation of gas hydrates is substantially reduced compared with the blank value. Ideally, snow-like, fine hydrate crystals form in the condensate phase and do not agglomerate and hence do not lead to blockage of the installations serving for gas transport and for gas production.

Synthesis of the Polymers

Example 1

5.0 g of methacrylic acid-$(EO)_5$-oleyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 45 g (0.32 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 2

10.0 g of methacrylic acid-$(EO)_5$-oleyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 40 g (0.29 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 3

25.0 g of methacrylic acid-$(EO)_5$-oleyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 25 g (0.18 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 4

5.0 g of methacrylic acid-$(EO)_8$-oleyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 45 g (0.29 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 5

25.0 g of methacrylic acid-$(EO)_8$-oleyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 25 g (0.18 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 6

5.0 g of methacrylic acid-$(EO)_3$-butyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 45 g (0.29 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 7

25.0 g of methacrylic acid-$(EO)_3$-butyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 25 g (0.18 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 8

45.0 g of methacrylic acid-$(EO)_3$-butyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 5 g (0.04 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 9

25.0 g of methacrylic acid-$(EO)_5$-butyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 25 g (0.18 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 10

25.0 g of methacrylic acid-$(EO)_5$-methyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 25 g (0.18 mol) of vinylcaprolactam and in 25 g of butylglycol was added dropwise over 1.5 hours. After the addition, the reaction solution was heated for a further 30 min, a further 0.5 g of initiator was then added and stirring was effected for a further 2 hours at 150° C.

Example 11

25.0 g of methacrylic acid-$(EO)_5$-butyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 25 g (0.23 mol) of vinylpyrrolidone and in 25 g of butylglycol was added dropwise over 1.5 hours. After the addition, the reaction solution was heated for a further 30 min, a further 0.5 g of initiator was then added and stirring was effected for a further 2 hours at 150° C.

Example 12

25.0 g of methacrylic acid-$(EO)_5$-methyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 25 g (0.23 mol) of vinylpyrrolidone and in 25 g of butylglycol was added dropwise over 1.5 hours. After the addition, the reaction solution was heated for a further 30 min, a further 0.5 g of initiator was then added and stirring was effected for a further 2 hours at 150° C.

Example 13

25.0 g of methacrylic acid-$(EO)_5$-methyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 10.0 g (0.10 mol) of N-vinyl-N-methylacetamide and 15 g (0.13 mol) of dimethylaminomethacrylamide in 25 g of butylglycol was added dropwise over 1.5 hours. After the addition, the reaction solution was heated for a further 30 min, a further 0.5 g of initiator was then added and stirring was effected for a further 2 hours at 150° C.

Example 14

25.0 g of methacrylic acid-$(EO)_5$-methyl ester and 1.0 g of dilauryl peroxide as a free radical initiator in 75 g of butylglycol were initially introduced into a 250 ml four-necked flask and heated to 150° C. while flushing with nitrogen. An $N_2$-flushed solution of 10.0 g (0.07 mol) of N-vinylcaprolactam and 15 g (0.13 mol) of dimethylmethacrylamide in 25 g of butylglycol was added dropwise over 1.5 hours. After the addition, the reaction solution was heated for a further 30 min, a further 0.5 g of initiator was then added and stirring was effected for a further 2 hours at 150° C.

Test Results

Composition of the natural gas used:
Methane 87.6%, ethane 1.26%, propane 0.08%, butane 0.02%, carbon dioxide 0.35%, nitrogen 10.61%.
Supercooling below the equilibrium temperature of hydrate formation at 65 bar: 7° C., supercooling at 90 bar, 8.5° C.

The comparative substance used was a solution of polyvinylcaprolactam in butylglycol, molecular weight 5000 g/mol.

| Polymer example | Dose ppm | Pressure p (bar) | $T_{ind}$ (h) | $T_{agg}$ (h) |
| --- | --- | --- | --- | --- |
| Blank value | — | 65 | 0 | 0 |
| Blank value | — | 90 | 0 | 0 |
| 1 | 5000 | 90 | 6.5 | 7.0 |
| 2 | 5000 | 90 | 6.4 | 7.8 |
| 4 | 5000 | 90 | 4.6 | 4.6 |
| 6 | 5000 | 90 | 12.6 | 12.8 |
| 6 | 5000 | 65 | >16.0 | — |
| 7 | 5000 | 90 | 10.1 | 11.0 |
| 9 | 5000 | 90 | 13.0 | 13.4 |
| 9 | 5000 | 65 | 13.9 | 14.4 |
| 12 | 5000 | 90 | 4.6 | 5.0 |
| 13 | 5000 | 90 | 0.2 | 0.5 |
| Comparison 1 | 5000 | 90 | 0.2 | 0.2 |
| Comparison 2 | 2500 | 90 | 5.2 | 5.2 |

As is evident from the above test results, the products according to the invention, especially those with short alkyl chains, act as kinetic hydrate inhibitors and show substantial improvement compared to the prior art.

To test the activity as agglomerate inhibitors, water and mineral spirit were initially introduced into the test autoclave used above (20% of the volume in the ratio of 1:2) and 5000 ppm, based on the aqueous phase, of the respective additive were added.

At an autoclave pressure of 90 bar and a stirring speed of 5000 rpm, the temperature was reduced from 17.5° C. initially to 2° C. in the course of 2 hours, stirring was then effected for 16 hours at 20° C. and heating was again carried out. The induction time up to the occurrence of the initial hydrate formation and the resultant stirrer torque, which is a measure of the agglomeration of the gas hydrates, were measured.

| Polymer example | $T_{ind}$ (h) | $M_{max}$ (Ncm) |
| --- | --- | --- |
| Blank value | 0.1 | 15.9 |
| 3 | 12.9 | 0.4 |
| 5 | >16 | n.d. |
| 8 | 9.4 | 2.1 |
| 10 | 8.2 | 3.2 |
| 11 | 10.2 | 1.5 |
| 14 | 8.6 | 3.7 |

As is evident from these examples, the measured torques were greatly reduced compared with the blank value, in spite of vigorous hydrate formation. This indicates a substantial agglomerate-inhibiting effect of the products according to the invention. Under the test conditions, the products surprisingly additionally have a substantial effect as kinetic inhibitors. In example 5, no hydrate formation was observed.

The invention claimed is:

1. A method for inhibiting hydrate formation in a wet hydrocarbon gas stream comprising an aqueous phase, said method comprising adding to the gas from 0.01 to 2% by weight, based on the aqueous phase, an additive comprising a copolymer having from 1 to 100 mol % of bivalent structural units of the formula

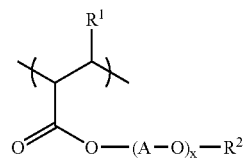

in which
$R^1$ is hydrogen or $C_1$-$C_6$-alkyl,
$R^2$ is $C_1$-$C_{24}$-alkyl, $C_2$-$C_{24}$-alkenyl or a $C_6$-$C_{18}$-aryl radical which may be substituted by a $C_1$-$C_{12}$-alkyl group,
A are identical or different $C_2$-$C_4$-alkylene radicals and
x is an integer from 2 to 40,
to inhibit the formation of hydrate in the wet hydrocarbon gas stream.

2. The method of claim 1, wherein the copolymer comprises
A) from 1 to 99 mol % of structural units of the formula (1) and
B) from 1 to 99 mol % of bivalent structural units of the formula (2)

in which $R^3$ and $R^4$, independently of one another, are hydrogen or $C_1$-$C_6$-alkyl, or form a ring of 5, 6 or 7 ring atoms with inclusion of a nitrogen atom and of a carbonyl group.

3. The method of claim 2, wherein said structural units of formula 2 are derived from a compound selected from the group consisting of N-vinylacetamide, N-methyl-N-vinylacetamide, vinylpyrrolidone, vinylcaprolactam, and mixtures thereof.

4. The method of claim 2 wherein said copolymer comprises
A) from 1 to 99 mol % of structural units of the formula (1),
B) from 1 to 99 mol % of structural units of the formula (2) and
C) from 1 to 99 mol % of bivalent structural units of the formula (3)

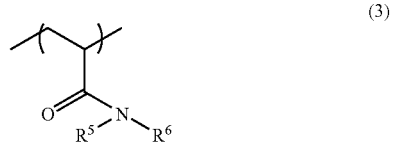

in which $R^5$ and $R^6$, independently of one another, are hydrogen, $C_1$-$C_6$-alkyl or $C_1$-$C_6$-cycloalkyl, or form a ring having 5, 6 or 7 ring atoms with inclusion of a nitrogen atom, and in which the structural units A), B) and C) sum to 100 mol %.

5. The method of claim 4, wherein the sum of structural units A), B) or C) is from 20 to 80 mol %.

6. The method of claim 4, wherein $R^3/R^4$ and $R^5/R^6$, independently of one another, contain at least 2 carbon atoms.

7. The method of claim 4, wherein the structural units of the formula 3 are derived from a compound selected from the group consisting of acrylic acid, acrylamide, N-alkylacrylamides, N,N-dialkylacrylamides, 2-dimethylaminomethacrylate, N-acryloylpyrrolidine, N-acryloylmorpholine, N-acryloylpiperidine, and mixtures thereof.

8. The method of claim 1, wherein the molecular weight of the copolymer is in the range from 1000 to $10^6$ g/mol.

9. The method of claim 1, wherein the wet hydrocarbon gas stream comprises water and natural gas components.

* * * * *